(12) United States Patent
Wolk

(10) Patent No.: US 10,690,092 B2
(45) Date of Patent: Jun. 23, 2020

(54) EGR SYSTEM FOR COMPOUND TURBOCHARGED ENGINE SYSTEM

(71) Applicant: Caterpillar Inc., Deerfield, IL (US)

(72) Inventor: Matthew T. Wolk, Peoria, IL (US)

(73) Assignee: Caterpillar Inc., Peoria, IL (US)

(*) Notice: Subject to any disclaimer, the term of this patent is extended or adjusted under 35 U.S.C. 154(b) by 50 days.

(21) Appl. No.: 15/951,309

(22) Filed: Apr. 12, 2018

(65) Prior Publication Data

US 2019/0316548 A1 Oct. 17, 2019

(51) Int. Cl.
| | |
|---|---|
| F02M 26/08 | (2016.01) |
| F02M 26/23 | (2016.01) |
| F02M 26/17 | (2016.01) |
| F02M 26/39 | (2016.01) |
| F02M 26/35 | (2016.01) |
| F02B 37/013 | (2006.01) |
| F01N 13/10 | (2010.01) |
| F02M 26/00 | (2016.01) |

(52) U.S. Cl.
CPC .......... *F02M 26/08* (2016.02); *F01N 13/107* (2013.01); *F02B 37/013* (2013.01); *F02M 26/17* (2016.02); *F02M 26/23* (2016.02); *F02M 26/39* (2016.02); *F02M 26/35* (2016.02); *F02M 2026/005* (2016.02)

(58) Field of Classification Search
CPC ........ F02M 26/08; F02M 26/17; F02M 26/23; F02M 26/39; F02M 26/35; F02M 2026/005; F02M 26/43; F02B 37/013; F02B 37/025; F01N 13/107

USPC .......... 60/605.2, 612, 599; 123/562, 568.12; 701/108
See application file for complete search history.

(56) References Cited

U.S. PATENT DOCUMENTS

| | | | |
|---|---|---|---|
| 7,287,378 B2 | 10/2007 | Chen et al. | |
| 7,891,345 B2* | 2/2011 | Pierpont | F02B 37/025 60/605.2 |
| 8,201,405 B2* | 6/2012 | Bruce | F02M 26/43 60/605.2 |
| 8,495,992 B2 | 7/2013 | Roth | |
| 9,051,903 B2 | 6/2015 | Wolk | |

(Continued)

FOREIGN PATENT DOCUMENTS

| | | |
|---|---|---|
| GB | 2519136 A | 4/2015 |
| WO | WO 2006/111280 A1 | 10/2006 |

*Primary Examiner* — Thai Ba Trieu
(74) *Attorney, Agent, or Firm* — Bookoff McAndrews

(57) ABSTRACT

An engine system includes an engine including a plurality of engine cylinders, an intake manifold, and an exhaust manifold; and a compound turbocharger system having a first turbine driving a first compressor, and a second turbine driving a second compressor. The engine system further includes an intake line including the first compressor, the second compressor, and the at least one intake manifold; and an exhaust line including the exhaust manifold, the second turbine, and the first turbine. The engine system also includes an exhaust restriction valve located in the exhaust manifold of the engine downstream of a subset of the plurality of the engine cylinders; and an exhaust gas recirculation line having an upstream end located to receive exhaust from the subset of the plurality of engine cylinders, and a downstream end coupled to the intake line downstream the first compressor and upstream of the second compressor.

20 Claims, 2 Drawing Sheets

(56) References Cited

U.S. PATENT DOCUMENTS

| | | | |
|---|---|---|---|
| 2007/0175215 A1* | 8/2007 | Rowells | F02M 26/08 60/605.2 |
| 2008/0000228 A1* | 1/2008 | Kieser | F02M 26/08 60/605.1 |
| 2008/0216475 A1* | 9/2008 | Kasper | F02M 26/08 60/605.2 |
| 2010/0011762 A1* | 1/2010 | Hokuto | F01N 13/107 60/602 |
| 2011/0030662 A1* | 2/2011 | Zitzler | F02M 26/08 123/568.12 |
| 2012/0216530 A1* | 8/2012 | Flynn | F02M 26/43 60/605.2 |
| 2013/0008417 A1 | 1/2013 | Sankar et al. | |
| 2014/0366532 A1* | 12/2014 | Talwar | F02M 26/43 60/605.2 |
| 2016/0138463 A1* | 5/2016 | Kubes | F02B 33/34 60/607 |
| 2016/0265423 A1* | 9/2016 | Nishioka | F02B 37/013 |
| 2017/0314481 A1* | 11/2017 | Karunaratne | F02D 41/0052 |

\* cited by examiner

EGR SYSTEM FOR COMPOUND TURBOCHARGED ENGINE SYSTEM

TECHNICAL FIELD

The present disclosure relates generally to internal combustion engine systems. More specifically, this disclosure relates to exhaust gas recirculation systems of compound turbocharged internal combustion engine systems.

BACKGROUND

An internal combustion engine system may include a compound turbocharger system. A compound turbocharger system includes a pair of turbochargers arranged with a pair of turbines fluidly connected in series, and a pair of compressors fluidly connected in series. Each turbine is mechanically coupled to a compressor, to drive the compressors with engine exhaust. The compressors, in turn, pressurize engine intake air that is supplied to the engine cylinders.

Such an engine system may also include an exhaust gas recirculation (EGR) system to assist in controlling the generation of undesirable pollutant gases and particulate matter. EGR systems recirculate a portion of engine exhaust into the incoming engine intake air thereby reducing the concentration of oxygen in the cylinders, which in turn lowers the peak in-cylinder combustion temperatures and exhaust temperature. Accordingly, EGR systems reduce the formation of certain pollutants, e.g., nitrous oxides (NOx), generally produced at higher combustion temperatures. Moreover, recirculating the exhaust gases promotes the combustion of unburned hydrocarbons in the exhaust gases, thus further reducing engine emissions. However, providing EGR reduces engine efficiency.

One example of an engine system having an EGR system can be found in U.S. Pat. No. 9,051,903, which discloses an EGR system that recirculates exhaust gas from one or two exhaust manifolds into the intake manifold. While the EGR system described by the '903 patent may be beneficial, the efficiency of such an engine system may be improved.

The engine system of the present disclosure may solve one or more of the problems set forth above and/or other problems in the art. The current scope of the disclosure, however, is defined by the attached claims and not by the ability to solve any specific problem.

SUMMARY OF THE DISCLOSURE

According to one aspect of the present disclosure, an engine system includes an engine including a plurality of engine cylinders, an intake manifold, and an exhaust manifold; and a compound turbocharger system having a first turbine driving a first compressor, and a second turbine driving a second compressor. The engine system further includes an intake line including the first compressor, the second compressor, and the at least one intake manifold; and an exhaust line including the exhaust manifold, the second turbine, and the first turbine. The engine system also includes an exhaust restriction valve located in the exhaust manifold of the engine downstream of a subset of the plurality of the engine cylinders; and an exhaust gas recirculation line having an upstream end located to receive exhaust from the subset of the plurality of engine cylinders, and a downstream end coupled to the intake line downstream the first compressor and upstream of the second compressor.

According to another aspect of the present disclosure, an engine system includes a spark-ignited, gaseous-fuel-powered engine including at least ten engine cylinders, an intake manifold, and an exhaust manifold; and a compound turbocharger system having a first turbine driving a first compressor, and a second turbine driving a second compressor. The engine system further includes an intake line including the first compressor, the second compressor, and the at least one intake manifold; and an exhaust line including the exhaust manifold, the second turbine, and the first turbine. The engine system also includes an exhaust restriction valve located in the exhaust manifold of the engine downstream of a subset of the plurality of the engine cylinders, the subset including at least 25% of a total of the plurality of engine cylinders of the engine; and an exhaust gas recirculation line having an upstream end located to receive exhaust from the subset of the plurality of engine cylinders, and a downstream end coupled to the intake line downstream the first compressor and upstream of the second compressor.

According to yet another aspect of the present disclosure, an engine system having an engine, a compound turbocharger system, an intake line, an exhaust line, and an exhaust gas recirculation line includes a method including supplying an intake fluid through the intake line including a first compressor and a second compressor of the compound turbocharger system, and to a plurality of engine cylinders and combusting the intake fluid in the plurality of engine cylinders. The method further includes directing an exhaust from the cylinders through the exhaust line including a second turbine and a first turbine of the compound turbocharger system; and selectively routing exhaust from a subset of the plurality of the cylinders through the exhaust gas recirculation line to the intake line at a location downstream the first compressor and upstream the second compressor.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Although the current disclosure will be described with reference to a spark-ignited, gaseous-fuel-powered (i.e., natural gas) engine system, this is only exemplary. In general, the current disclosure can be applied to any other type of internal combustion engine including, but not limited to, a diesel engine or a gasoline engine. The internal combustion engine may be used to power a machine, such as a locomotive.

For the purposes of the disclosure, two elements that are "fluidly connected" include two elements that are attached, coupled or otherwise connected in a manner such fluid may move from one element to the other, such as, e.g., via a pipe, conduit, tube, or other connection. In this disclosure, relative terms, such as, for example, "approximately," "substantially" "generally," or "about" are used to indicate a possible variation of ±5% in the stated value.

Figure 1:
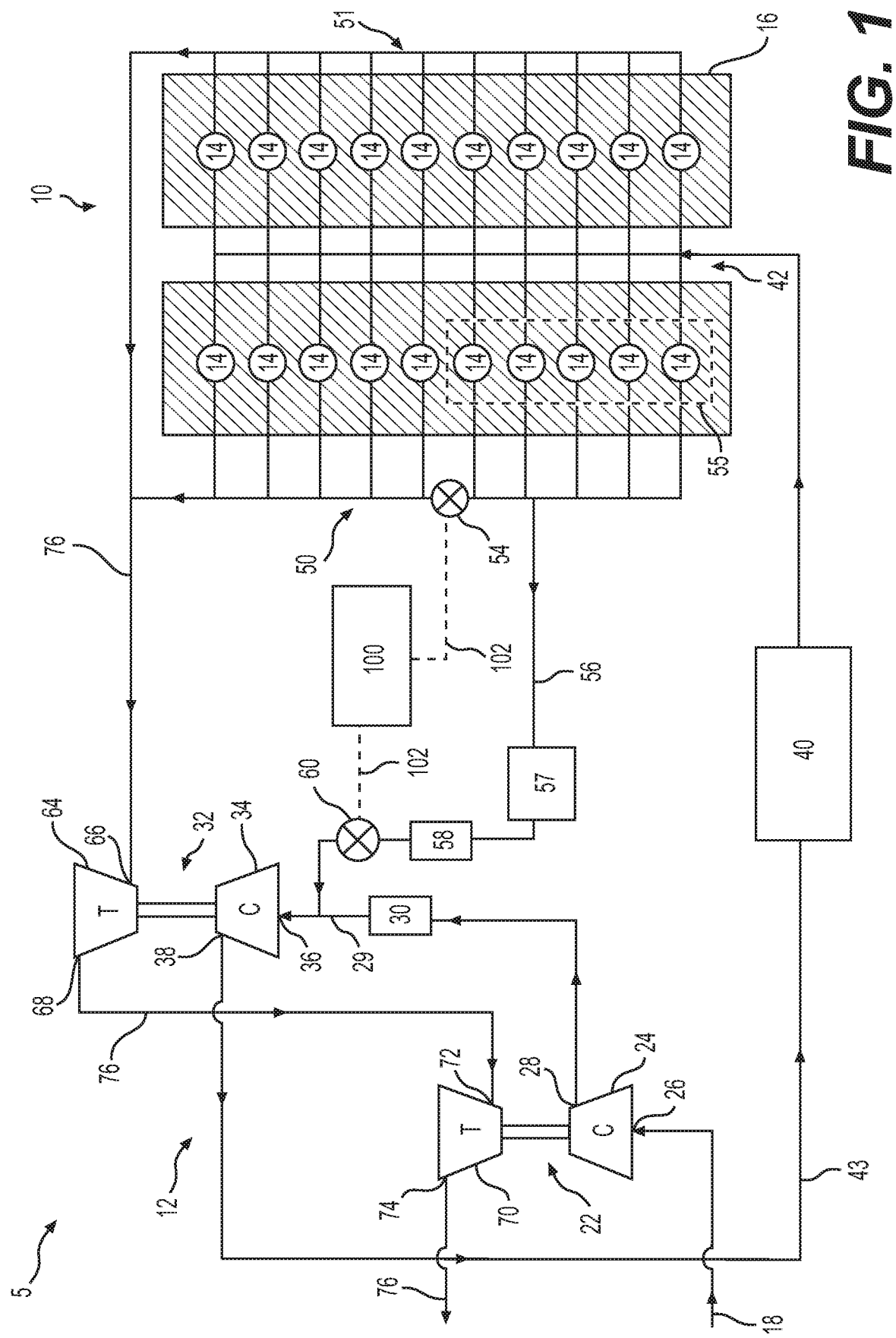
FIG. 1 illustrates a schematic representation of an engine system according to the disclosure.

FIG. 1 illustrates an internal combustion engine system 5 including a spark-ignited, natural gas engine 10 and a compound turbocharger system 12. The engine 10 includes a plurality of cylinders 14 (e.g., 20 cylinders) housed in an engine block 16. While the engine 10 is described with 20 cylinder, the engine may include at least ten cylinders, or in some instances less than ten cylinders. Engine 10 is shown with two rows cylinders 14, however, the present disclosure is not limited to this embodiment. The plurality of cylinders 14 may be arranged in an inline, V, or other configuration. The engine 10 may include conventional valves, spark plugs, manifolds, etc. associated with the engine cylinders 14.

Engine intake air may be received into engine system 5 through intake line 18 that is fluidly connected to a first turbocharger 22. First turbocharger 22 includes a first compressor 24 having an inlet 26 and an outlet 28. Intake line 18 is connected to first compressor inlet 26. First compressor 24 is mechanically coupled with a first turbine 70 so that rotation of first turbine 70 drives/rotates first compressor 24. First turbine 70 has an inlet 72 for receiving engine exhaust, and an outlet 74 feeding engine exhaust to an aftertreatment system (not shown).

First compressor outlet 28 is fluidly connected in series to a second compressor 34 of a second turbocharger 32 through a conduit 29. Conduit 29 may include an intercooler 30 having a conventional structure. The second compressor 34 has an inlet 36 and an outlet 38. Second compressor 34 is mechanically coupled with second turbine 64, such that rotation of second turbine 64 drives/rotates second compressor 34.

As shown in FIG. 1, second compressor outlet 38 may be fluidly connected via line 43 to an aftercooler 40 and an engine intake manifold 42. Intake manifold 42 is fluidly connected to each of the cylinders 14 of engine 10. While only one intake manifold 42 is schematically depicted in FIG. 1, it is understood that more than one intake manifold may be included in engine system 5. While not shown, fuel may be introduced into the engine system 5 at any appropriate location, as is known in the art. For example, fuel may be introduced directly into engine cylinders 14, or introduced into intake manifold 42 upstream of the plurality of cylinders 14. The fuel for engine system 5 may comprise natural gas such as, e.g., compressed natural gas (CNG) or liquefied natural gas (LNG)). In addition or alternatively, the fuel may comprise gasoline, diesel fuel, biodiesel, ethanol, bioethanol, methane, propane, or any other fuel suitable for use in an internal combustion engine.

Cylinders 14 of engine 10 are also connected to one or more engine exhaust manifolds 50, 51. As will be described in more detail below, all, or less than all, of engine cylinders 14 may be fluidly connected through exhaust manifolds 50, 51 to inlet 66 of second turbine 64 through an exhaust line 76. Outlet 68 of second turbine 64 is fluidly connected with inlet 72 of first turbine 70. As noted above, first turbine outlet 74 may be connected to an aftertreatment system (not shown), including one or more catalysts, mufflers, heat exchangers, etc.

Exhaust manifold 50 may include an exhaust restriction valve (ERV) 54 located downstream of a subset of engine cylinders 14, but upstream other cylinders 14 of the engine 10. ERV 54 controls whether exhaust from the subset of engine cylinders 14 ("EGR cylinders 55") exits the engine via exhaust line 76 to second turbine 64, or is recirculated through an exhaust gas recirculation ("EGR") line 56 to an intake side of the engine 10, as will be discussed in more detail below.

As shown in FIG. 1, ERV 54 may be disposed, for example, downstream of five (5) engine cylinders connected to exhaust manifold 50, but upstream of the remaining five (5) cylinders of exhaust manifold 50. Thus, ERV 54 controls twenty-five percent (25%) of the twenty (20) cylinders 14 of engine 10. It is understood that this number and percentage of engine cylinders 14 controlled by ERV 54 is exemplary only, and the ERV 54 may control at least 25%, more than 25%, or less than 25% of the engine cylinders 14 without departing from this disclosure.

ERV 54 may be a valve designed of withstanding the heat and particulates of the exhaust manifold 50, and may include, for example, an electronically controlled butterfly-type valve, or any other appropriate valve. ERV 54 may be actuated between a fully open condition and a fully closed condition based on signals received from a controller 100. In the fully open condition, exhaust gases from the EGR cylinders 55 travel to the exhaust line 76, while in the fully closed condition the exhaust gases from EGR cylinders 55 travel through the EGR line 56 toward second compressor 34.

EGR line 56 fluidly connects exhaust manifold 50 and EGR cylinders 55 with conduit 29 at a location downstream the first compressor 24 and the intercooler 30, and upstream second compressor 34. While EGR line 56 is schematically shown as coupled to the exhaust manifold 50 upstream of ERV 54, it is understood that EGR line 56 may alternatively be located at ERV 54 as a part of ERV 54. Further, as used herein, a location upstream the second compressor 34 includes coupling EGR line 56 directly to the inlet 36 of the second compressor 34. EGR line 56 may alternatively be coupled to conduit 29 upstream of the aftercooler 40, yet downstream of the first compressor 24. EGR line 56 may include a catalyst 57, EGR cooler 58, and an EGR valve 60. EGR valve 60 may be actuated by controller 100 to move between an open position and a closed position in coordination with ERV 54 to control the flow of exhaust gas into conduit 29 and thus into the second compressor 34. It is understood that the engine system 5 will be designed or tailored so that appropriate pressures are achieved to provide for the fluid flows set forth above. This may include, for example, sizing the first and second turbochargers 22, 32 to provide desired flows and pressures.

Controller 100 may be connected to ERV 54 and EGR valve 60 through signal lines 102 to monitor and control the movement of each valve. Controller 100 of engine system 5 may include one or more microprocessors, memory, software, and firmware for executing various functions, such as those provided in FIG. 2. Controller 100 may also be connected to various other engine sensors and/or engine components (not shown) to send and receive signals for monitoring and controlling engine parameters, as is known in the art. Such engine sensors/components may be monitor and/or control e.g., fuel rate, engine speed, exhaust particulates, etc. as is know in the art.

INDUSTRIAL APPLICABILITY

The disclosed engine system 5 may be used in any machine where implementing exhaust gas recirculation to reduce emissions is desired. For example, the engine system of the present disclosure may be find applicability with locomotive engine systems.

Figure 2:
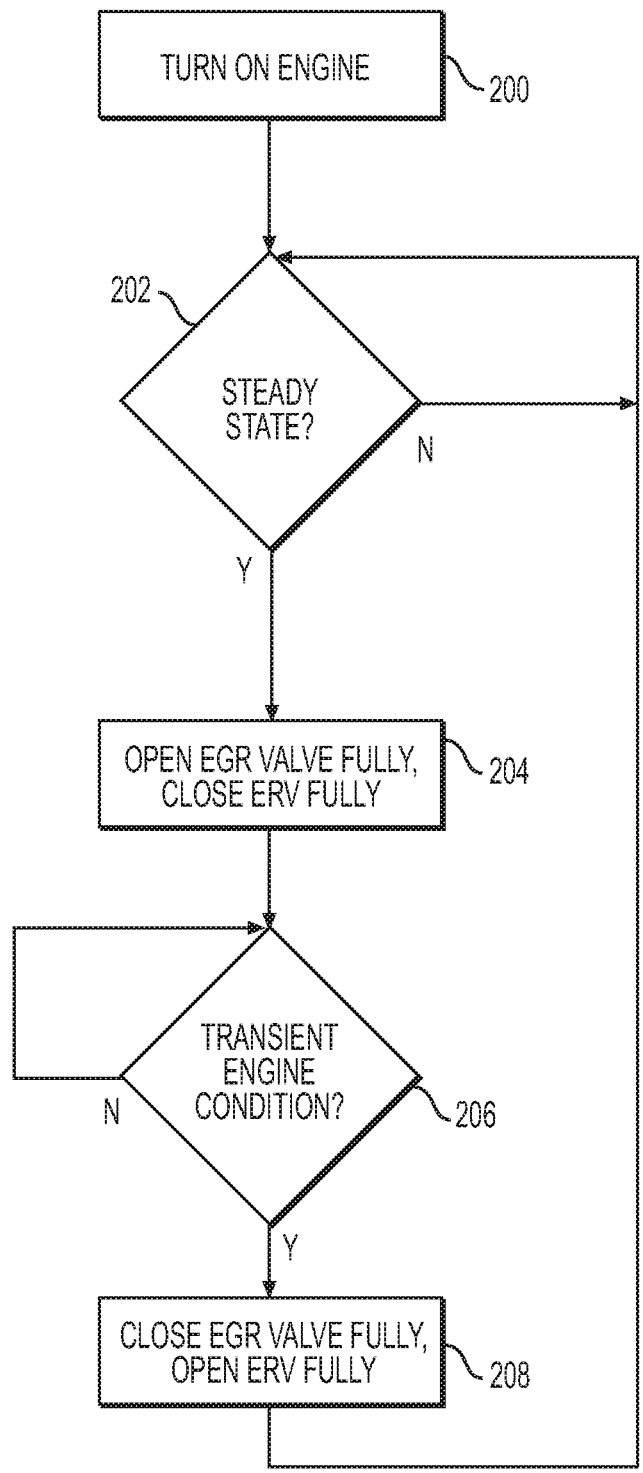
FIG. 2 is a flow chart of a method of operating the engine system of FIG. 1.

An exemplary operation of engine system 5 is shown in FIG. 2. At step 200, engine 10 is turned on and a fluid flows into engine 10 through compound turbocharger system 12. Initially, EGR valve 60 is closed fully, and ERV is fully open. Intake air, is supplied through intake line 18 to first compressor inlet 26 of first turbo charger 22. Intake air travels through first compressor 24, intercooler 30, second compressor 34, aftercooler 40, and into engine intake manifold 42. The compressed and cooled intake air then flows into the plurality of cylinders 14.

Fuel is introduced into engine system 5 to produce a mixture of the air and fuel within the plurality of cylinders 14. The mixture within the plurality of cylinders is combusted by igniting the air-fuel mixture using spark plugs (not shown) associated with the engine cylinders 14. Exhaust is discharged from the plurality of cylinders 14 through exhaust manifold 50 and into exhaust line 76. Exhaust flows through the second turbine 64 and through the first turbine 70, and then to an aftertreatment system (not shown).

The controller 100 continually monitors operation of engine system 5 to determine whether engine operation has reached a steady state condition (step 202), corresponding to a generally constant fuel rate and/or engine speed. If the engine system 5 has reached a steady state, ERV 54 is actuated to close fully and EGR valve 60 is actuated to open fully (step 204). Closing ERV 54 the exhaust from EGR cylinders 55 to the intake of the second compressor 34 through EGR line 56. Exhaust gas flowing through EGR line 56 passes through catalyst 57 and is cooled by EGR cooler 58 before being reintroduced into second compressor inlet 34 through conduit 29. Engine system 5 continues to operate in this condition as controller 100 monitors engine system 5 to detect a transient engine condition (step 206) corresponding to a situation when the fuel rate and/or engine speed is not generally constant. If a transient engine system condition is detected, EGR valve 60 is closed fully, and ERV 54 is opened fully to operate the engine system without exhaust gas recirculation (step 208). Engine system 5 then returns to step 202, monitoring engine system 5 performance for indication of a steady state condition.

By isolating the EGR cylinders 55 from the remaining engine cylinders 14 during EGR, the EVR cylinders may experience lower exhaust pressures than the remaining engine cylinders 14. This may lower the total PMEP (pumping mean effective pressure) of the engine system 5, providing a more efficient engine system. This lower total PMEP may be more significant in high power density engines (i.e., engine systems having at least 10 bar BMEP) due the percentage of desired EGR in such engine systems (i.e., at least approximately 25% of the total engine cylinders supplying EGR exhaust). Further, providing the EGR exhaust to the second compressor 34 downstream of the first compressor 24 may allow for a balancing of turbocharger size (and associated responsiveness) with engine efficiency.

It will be apparent to those skilled in the art that various modifications and variations can be made to the disclosed system without departing from the scope of the disclosure. Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An engine system, comprising:
   an engine including a plurality of engine cylinders, an intake manifold, and an exhaust manifold;
   a compound turbocharger system having a first turbine driving a first compressor, and a second turbine driving a second compressor;
   an intake line including the first compressor, the second compressor, and the intake manifold;
   an exhaust line including the exhaust manifold, the second turbine, and the first turbine;
   an exhaust restriction valve located in the exhaust manifold of the engine downstream of a subset of the plurality of the engine cylinders;
   an exhaust gas recirculation line having an upstream end located to receive exhaust from the subset of the plurality of engine cylinders, and a downstream end coupled to the intake line downstream of the first compressor and upstream of the second compressor;
   an exhaust gas recirculation valve located in the exhaust gas recirculation line, wherein the exhaust restriction valve and the exhaust gas recirculation valve are each configured to move between a fully open and fully closed condition; and
   a controller configured to actuate the exhaust restriction valve to a fully closed position and to actuate the exhaust gas recirculation valve to a fully opened position when the engine reaches a steady state condition.

2. The engine system of claim 1, wherein the subset of cylinders is equal to at least 25% of a total of the plurality of engine cylinders of the engine.

3. The engine system of claim 2, wherein the total of the plurality of engine cylinders of the engine includes at least ten cylinders.

4. The engine system of claim 1, wherein the downstream end of the exhaust gas recirculation line is coupled to the intake line downstream of an intercooler.

5. The engine system of claim 4, wherein the exhaust gas recirculation line includes a cooler.

6. The engine system of claim 1, wherein the engine is a spark-ignited, gaseous-fuel-powered engine.

7. The engine system of claim 1, wherein the engine includes a plurality of exhaust manifolds, and the exhaust restriction valve is boated in one of the plurality of exhaust manifolds.

8. The engine system of claim 1, wherein the controller is configured to determine when the engine reaches the steady state condition by monitoring a fuel rate of the engine and/or a speed of the engine.

9. The engine system of claim 1, wherein the controller is further configured to send control signals to fully open the exhaust restriction valve and fully close the exhaust gas recirculation valve during a transient condition of the engine.

10. An engine system, comprising:
    a spark-ignited, gaseous-fuel-powered engine including at least ten engine cylinders, an intake manifold, and an exhaust manifold;
    a compound turbocharger system having a first turbine driving a first compressor, and a second turbine driving a second compressor;
    an intake line including the first compressor, the second compressor, and the intake manifold;
    an exhaust line including the exhaust manifold, the second turbine, and the first turbine;
    an exhaust restriction valve located in the exhaust manifold of the engine downstream of a subset of the plurality of the engine cylinders, the subset including at least 25% of a total of the plurality of engine cylinders of the engine;
    an exhaust gas recirculation line having an upstream end located to receive exhaust from the subset of the plurality of engine cylinders, and a downstream end coupled to the intake line downstream of the first compressor and upstream of the second compressor;

an exhaust gas recirculation valve located in the exhaust gas recirculation line, wherein the exhaust restriction valve and the exhaust gas recirculation valve are each configured to move between a fully open and fully closed condition; and a controller configured to actuate the exhaust restriction valve to a fully closed position and to actuate the exhaust gas recirculation valve to a fully opened position when the engine reaches a steady state condition.

11. The engine system of claim 10, wherein the downstream end of the exhaust gas recirculation line is coupled to the intake line downstream of an intercooler.

12. The engine system of claim 11, wherein the exhaust gas recirculation line includes a cooler.

13. The engine system of claim 10, wherein the controller is configured to determine when the engine reaches the steady state condition by monitoring a fuel rate of the engine and/or a speed of the engine.

14. The engine system of claim 10, wherein the controller is further configured to send control signals to fully open the exhaust restriction valve and Billy close the exhaust gas recirculation valve during a transient condition of the engine.

15. A method of operating an engine system including an engine, a compound turbocharger system connected to the engine, an intake line including a first compressor and a second compressor of the compound turbocharger system in fluid communication with the engine, an exhaust line including a first turbine and a second turbine of the compound turbocharger system in fluid communication with the engine, an exhaust gas recirculation line in fluid communication with the engine, and a controller, the method comprising:

supplying an intake fluid through the intake line including the first compressor and the second compressor of the compound turbocharger system, and to a plurality of engine cylinders;

combusting the intake fluid in the plurality of engine cylinders;

directing an exhaust from the cylinders through the exhaust line including the second turbine and the first turbine of the compound turbocharger system; and selectively routing exhaust from a subset of the plurality of the cylinders through the exhaust gas recirculation line to the intake line at a location downstream of the first compressor and upstream of the second compressor, by actuating an exhaust restriction valve located in an exhaust manifold downstream of the subset of the plurality of engine cylinders to a fully closed position and by actuating an exhaust gas recirculation valve located in the exhaust gas recirculation line to a fully opened position, with the controller, when the engine reaches a steady state condition.

16. The method of claim 15, further including cooling the selectively routed exhaust with a cooler positioned in the exhaust gas recirculation line.

17. The method of claim 15, wherein the selectively routing includes routing exhaust from 25% or more of a total of the plurality of engine cylinders of the engine by closing the exhaust restriction valve with the controller.

18. The method of claim 15, further including determining, by the controller, when the engine reaches the steady state condition by monitoring a fuel rate of the engine and/or a speed of the engine.

19. The method of claim 15, wherein selecting routing exhaust includes sending control signals to fully open the exhaust restriction valve and fully close the exhaust gas recirculation valve during a transient condition of the engine.

20. The method of claim 15, wherein the combusting step includes igniting an air-fuel mixture including the intake fluid using spark plugs.

* * * * *